United States Patent
McCarthy et al.

(10) Patent No.: US 12,337,529 B2
(45) Date of Patent: *Jun. 24, 2025

(54) COMPENSATING LASER ALIGNMENT FOR IRREGULARITIES IN AN ADDITIVE MANUFACTURING MACHINE POWDERBED

(71) Applicant: General Electric Company, Schenectady, NY (US)

(72) Inventors: Brian Scott McCarthy, Schenectady, NY (US); Dean Andrew Snelling, Jr., Statesboro, GA (US); Thomas Adcock, Glenville, NY (US); Donnell Crear, Simpsonville, SC (US); Michael Evans Graham, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,437

(22) Filed: May 15, 2023

(65) Prior Publication Data

US 2023/0278282 A1 Sep. 7, 2023

Related U.S. Application Data

(63) Continuation of application No. 16/289,076, filed on Feb. 28, 2019, now Pat. No. 11,679,551.

(51) Int. Cl.
*B29C 64/153* (2017.01)
*B22F 10/20* (2021.01)
(Continued)

(52) U.S. Cl.
CPC ............ *B29C 64/153* (2017.08); *B22F 10/20* (2021.01); *B22F 10/31* (2021.01); *B22F 12/90* (2021.01);
(Continued)

(58) Field of Classification Search
CPC ....... B33Y 50/02; B33Y 10/10; B29C 64/393; B22F 10/31; B22F 10/80
See application file for complete search history.

(56) References Cited

U.S. PATENT DOCUMENTS

| | | | |
|---|---|---|---|
| 5,430,666 | A | 7/1995 | DeAngelis et al. |
| 5,832,415 | A | 11/1998 | Wilkening et al. |

(Continued)

FOREIGN PATENT DOCUMENTS

| | | |
|---|---|---|
| CN | 10773823 A | 8/2017 |
| EP | 2983896 B1 | 4/2017 |
| WO | WO2018086995 A1 | 5/2018 |

OTHER PUBLICATIONS

Edmund Optics, Simplifying Laser Alignment, 2018. Retrieved from Website: https://www.edmundoptics.com/knowledge-center/application-notes/lasers/simplifying-laser-alignment.
(Continued)

*Primary Examiner* — Lam S Nguyen
(74) *Attorney, Agent, or Firm* — Wood Herron & Evans LLP

(57) ABSTRACT

A system for additive manufacturing machine energy beam alignment error compensation includes, a calibration table having x-y planar offsets to correct laser alignment errors representing energy beam positional offsets between beam-steering commanded energy beam locations and fiducial marks generated on a burn-paper, a recoater mechanism that distributes successive layers of powder, one or more sensors monitoring the powderbed surface proximal to the beam scan unit, and a processor unit configured to perform a method. The method including collecting sensor data representing height variations across at least a portion of the powderbed surface, deriving dimensional data from the collected data, analyzing the dimensional data to determine a distribution of differences between the powderbed surface (Continued)

and a calibration plane used for a first spatial calibration, and calculating z-axis calibration offset points for inclusion in the calibration table x-y planar offsets. A method and a non-transitory medium are also disclosed.

20 Claims, 3 Drawing Sheets

(51) Int. Cl.
- *B22F 10/31* (2021.01)
- *B22F 12/90* (2021.01)
- *B29C 64/268* (2017.01)
- *B29C 64/393* (2017.01)
- *B33Y 50/02* (2015.01)
- *B22F 12/45* (2021.01)
- *B22F 12/49* (2021.01)
- *B22F 12/60* (2021.01)
- *B33Y 10/00* (2015.01)
- *B33Y 30/00* (2015.01)

(52) U.S. Cl.
CPC .......... *B29C 64/268* (2017.08); *B29C 64/393* (2017.08); *B33Y 50/02* (2014.12); *B22F 12/45* (2021.01); *B22F 12/49* (2021.01); *B22F 12/60* (2021.01); *B33Y 10/00* (2014.12); *B33Y 30/00* (2014.12)

(56) References Cited

U.S. PATENT DOCUMENTS

| | | | |
|---|---|---|---|
| 6,492,651 B2 * | 12/2002 | Kerekes | B22F 10/80 |
| | | | 356/3.01 |
| 6,930,278 B1 | 8/2005 | Chung et al. | |
| 9,341,467 B2 | 5/2016 | Snis | |
| 10,399,271 B2 * | 9/2019 | Sanz Ananos | B33Y 10/00 |
| 11,084,213 B2 | 8/2021 | Pieger et al. | |
| 2014/0131921 A1 | 5/2014 | Kusters et al. | |
| 2016/0082668 A1 | 3/2016 | Perret et al. | |
| 2017/0120337 A1 | 5/2017 | Kanko et al. | |
| 2017/0334144 A1 | 11/2017 | Fish et al. | |
| 2018/0281067 A1 | 10/2018 | Small et al. | |
| 2019/0118481 A1 | 4/2019 | Brown | |
| 2020/0023585 A1 | 1/2020 | Wiesner et al. | |
| 2020/0232785 A1 | 7/2020 | Mosher et al. | |

OTHER PUBLICATIONS

Vlasea et al., Development of Powder Bed Fusion Additive Manufacturing Test Bed For Enhanced Real-Time Process Control, NIST Publications, Aug. 2015, pp. 527-539.

* cited by examiner

COMPENSATING LASER ALIGNMENT FOR IRREGULARITIES IN AN ADDITIVE MANUFACTURING MACHINE POWDERBED

CROSS-REFERENCE TO RELATED APPLICATIONS

This application is a continuation application of U.S. application Ser. No. 16/289,076 filed Feb. 28, 2019, which is hereby incorporated by reference in its entirety.

BACKGROUND

Some implementations of additive manufacturing machines perform additive manufacturing processes that use laser energy to fuse successive layers of powderbed material to build a three-dimensional (3D) part. A direct metal laser melting (DMLM) and a direct metal laser sintering (DMLS) are examples of an additive manufacturing machine. Within this disclosure, the terms "direct metal laser melting", "DMLM", "direct metal laser sintering", "(DMLS)", and "additive manufacturing machine" are used interchangeably.

An additive manufacturing machine includes one or more energy sources (e.g., laser or electron beams). Beam shaping optics focuses the energy to form one or more collimated beams. A scanning unit can direct the beam(s) across the powderbed in a two-dimensional pattern determined by an electronic file that models in three dimensions (3D) the object being produced (e.g., a CAD file). The scanning unit focuses the beam transverse to the beam propagation direction (y-axis) to a location on an x-y plane following a two-dimensional (2D) input pattern representing a layer from the 3D model file. Sequential layering builds the 3D structure.

Maintaining alignment between each 2D layer pattern and the actual laser position on the powderbed is error prone and labor intensive when done manually. One critical aspect affecting adding to a misalignment is the position, tilt and flatness of the powderbed being scanned. Conventional approaches to quantify the misalignment and obtain calibration offsets can include installing a calibration plate on the additive manufacturing machine build plate. A burn-paper on the surface of the calibration plate is marked with laser spots across the x-y plane to point (a) of reference. Removal of the burn-paper and the measurement of the burn marks can provide 2D offsets between the x-y plane location that the scanning unit directed the beam(s) and the x-y plane location of the burn marks. These 2D offsets can be tabulated into a calibration table accessed by the scanning system.

The conventional approach to obtaining calibration offsets is labor intensive and can be prone to error. Errors are not only introduced in the location measurement of the burn marks, but also introduced in system errors. For example, one error can be introduced by difference between the z-axis (i.e., height) location of the burn-paper compared to powderbed surfaces; another error can be introduced by unevenness of the powderbed surface. Additionally, these powderbed-dependent errors can vary from layer to layer depending on the recoater consistency.

What is missing from the art is a non-manual system that can determine the magnitude of these, and other, powderbed-dependent errors; quantify a correction factor(s); and introduce the correction factors into the calibration table to account for a change in powderbed position and flatness, and recoater mechanism defects.

DESCRIPTION

Embodying systems and methods can compensate laser alignment errors in an additive manufacturing machine. These systems and methods can measure the differences along the z-axis of an additive manufacturing machine between the powderbed and the burn-paper on a calibration plate positioned in an x-y plane, determine an offset(s) that incorporates parallax errors based on the differences, and provide the offset(s) to a calibration table. In accordance with embodiments, height (one-dimensional (1D)), tilt (2D), and/or flatness (3D) positional data about the relative alignment of the optical origin of the beam(s) to the build plate can be determined in developing the calibration offset(s).

Incorporation into calibration tables the z-axis calibration offset(s) determined by embodying methods is less expensive, less error prone, and more accurate than the conventional approach of repositioning the build plate in up to six degrees of freedom during the scan operation; or the conventional approach of striving for perfectly flat calibration surfaces that are positioned in correct 3D alignment with powderbed surfaces produced by a perfectly even recoater.

Figure 1:
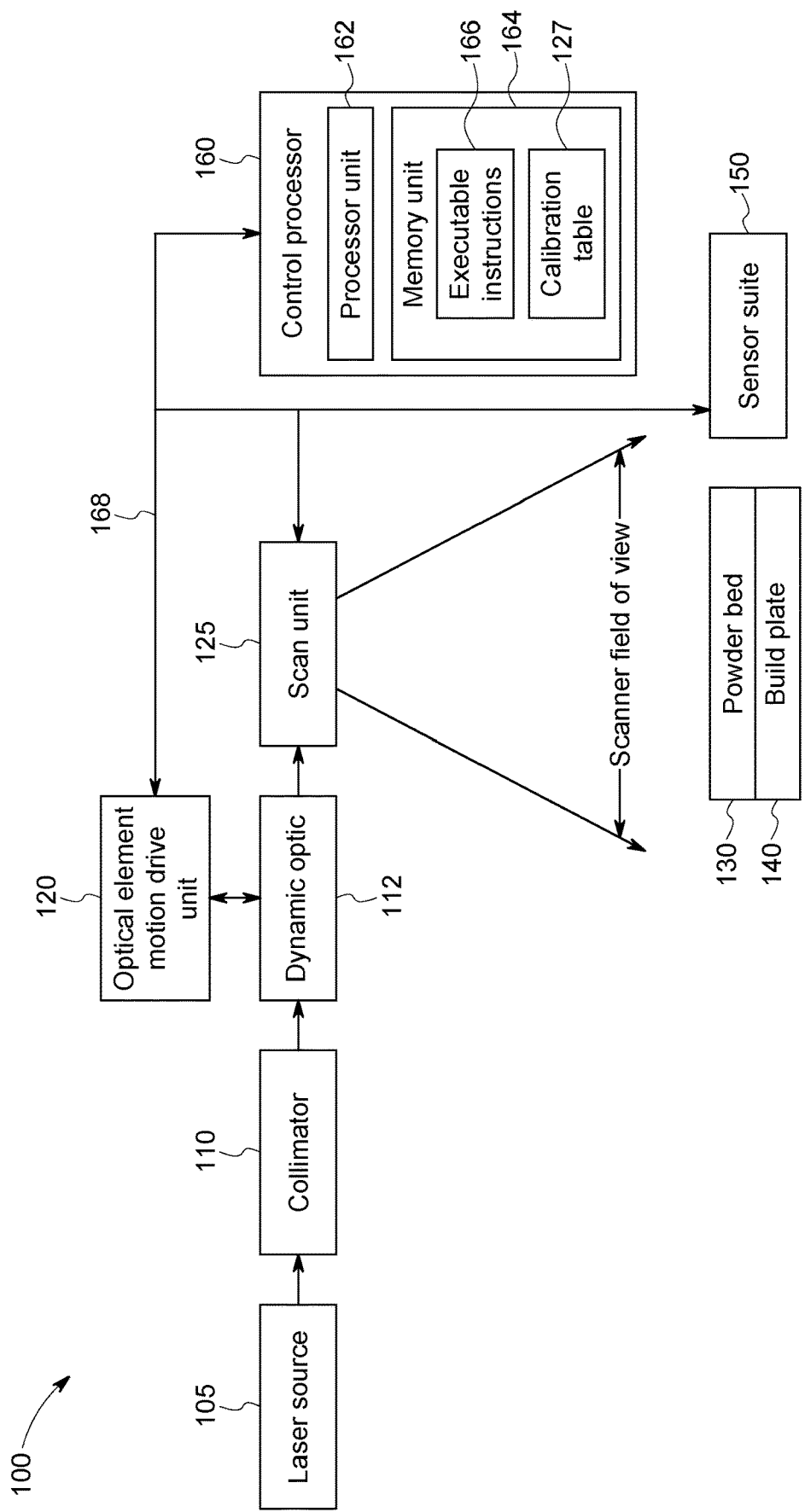
FIG. 1 schematically depicts an additive manufacturing machine in accordance with embodiments.

FIG. 1 schematically depicts additive manufacturing machine 100 in accordance with embodiments. Collimator 110 forms a parallel beam from laser light provided by laser source 105. It should be readily understood that embodying systems and methods are not limited by the nature and/or type of energy source. Dynamic optics unit 112 contains optical elements that can be mechanically movable in relation to one another under the control of optical element motion drive unit 120. Dynamic movement of the optical elements alters their focal length to refocus the laser beam as scan unit 125 scans the beam in an x-y plane across powderbed 130. As successive layers are produced, build plate 140 is lowered and the powderbed is refreshed by a recoater (not shown) distributing additional powder.

Control processor 160 can include processor unit 162 and memory unit 164. The memory unit can store executable instructions 166. The control processor can be in communication with components of system 100 across local control/data network 168 and/or electronic communication networks. Processor unit 162 can execute executable instructions 166, which cause the processor to perform the calculation of laser alignment error compensation factors for an additive manufacturing machine in accordance with embodiments. Memory unit 164 can provide the control processor with local cache memory and storage memory to store, for example, calibration table 127. The scan unit can access calibration table 127 to offset the beam steering commands.

Figure 1A:
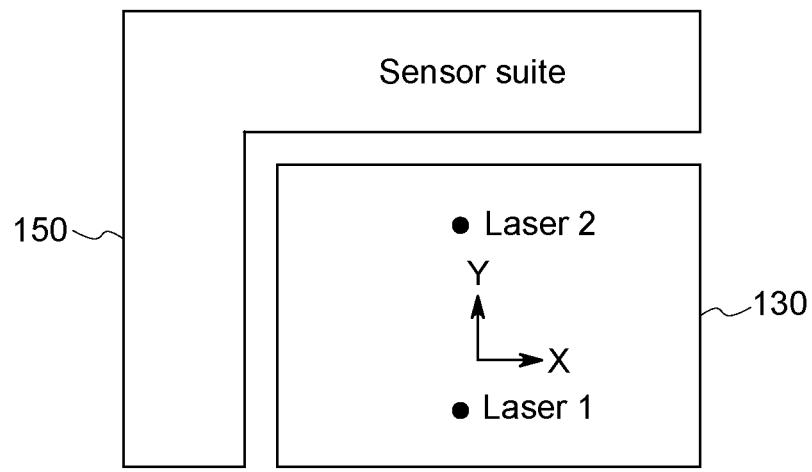
FIG. 1A schematically depicts a top view of a portion of the additive manufacturing machine of FIG. 1 in accordance with embodiments.

In accordance with embodiments, sensor suite 150 can monitor the powderbed surface of the successive powder layers. FIG. 1A depicts a top view of the sensor suite position in relation to the powderbed in accordance with embodiments. In other implementations, sensor suite 150 can be along a single edge, or all edges, of the powderbed. Placement of the sensor suite can be dependent on the sensor technology. This technology can include optical detectors, image capture devices, line array laser sensors, mechanical measurement devices, etc. Embodying systems and methods are not limited to any one sensor technology. The sensor information can be analyzed by applying machine learning techniques to quantify the positional differences between the powderbed surface and the location of the burn-paper calibration plane.

By measuring the position and shape of the powderbed surface over at least a portion of the scanfield, embodying systems and methods can update the calibration table related to the beam positioning device to account for this variation in position and shape. In accordance with embodiments, the measurement and determination of offsets can be dynamically performed for each successive powderbed layer and actively provided to the scan unit prior to, or during, each scan.

The scanfield data can be either collected at various heights to form a 3D scanfield measurement or calculated based on 2D measurements and known machine configuration geometry. The scanfield correction can then be introduced into calibration tables to account for actual positional variations, thus ensuring that absolute and relative laser alignment are maintained on the surface of the powderbed regardless of its flatness, tilt, and or position.

Figure 2:
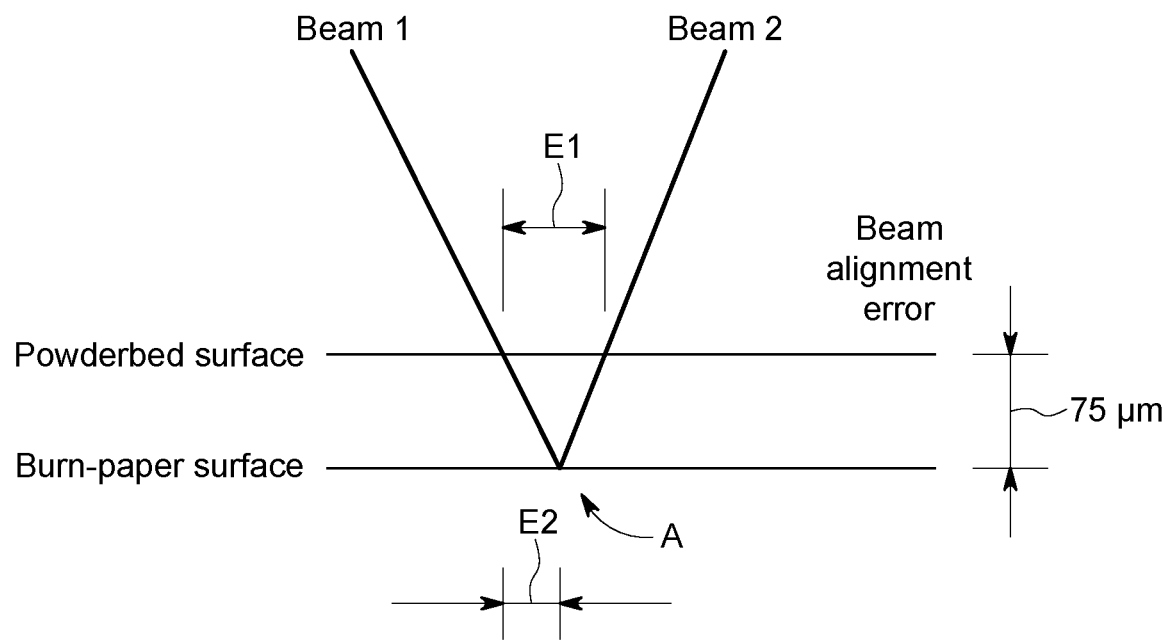
FIG. 2 depicts a representation of potential error sources in an additive manufacturing machine.

FIG. 2 depicts a representation of potential error sources in an additive manufacturing machine. The height, tilt, and/or flatness of the powderbed relative to the origin of the beam can cause alignment and scaling issues in the scanfield. FIG. 2 includes two energy beams beam1, beam2. During conventional calibration, the scan unit can direct the beams to mark the burn-paper surface at point A in the x-y plane. The conventional approach then manually measures an x-y planar offset between the scan command and the actual mark. This offset is provided to a calibration table that is accessed during product builds.

Differences between the burn-paper calibration plane and the powderbed surface plane introduces a beam alignment error along the z-axis. At the powderbed surface plane, the z-axis beam alignment error can cause an error between the two energy beams of error magnitude E1. This error E1 can cause misalignment between portions of the build and can cause a seam where the two energy beams meet. With a single energy beam system, the z-axis error can introduce an error of magnitude E2. Embodying systems and methods can determine beam steering correction offsets for errors E1, E2 to ensure proper alignment of energy beams to the scan image file to achieve proper build alignment and dimensions.

During scanning operations, the parallax error introduced by this z-axis beam misalignment is minimal at a location close to or below the energy beam source (i.e., the more normal the beam z-axis is to the x-y plane of the powderbed, the less the error). As the beam is scanned off-axis, the magnitude of errors E1, E2 can increase. For example, if a calibration procedure burns a 1 $mm^2$ outline of a square on the burn-paper, at the powderbed surface the outline can be different by a scaling factor based on the magnitude of the beam alignment error; additionally, in combination with other errors the outline might not be a true square.

Figure 3:
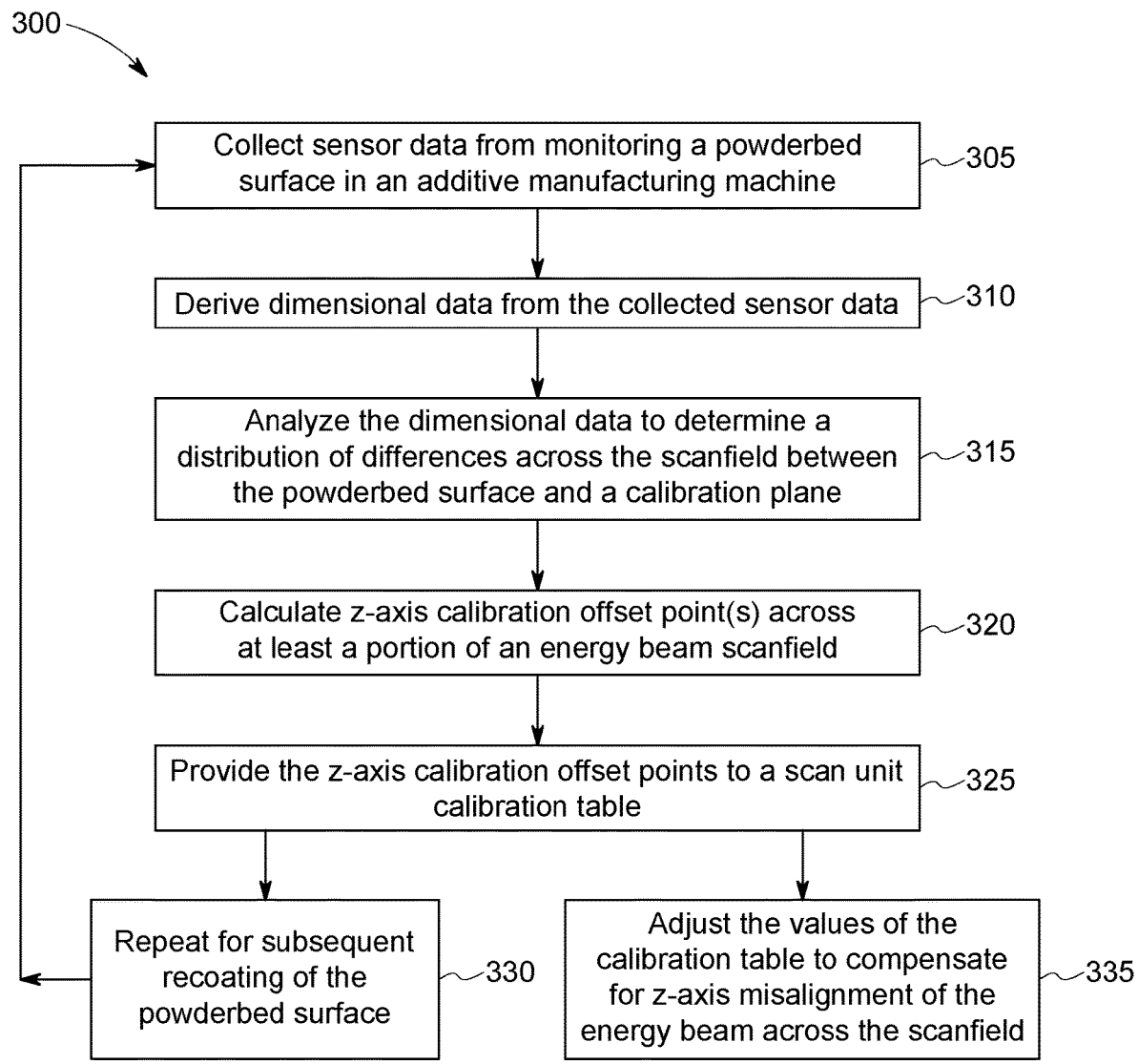
FIG. 3 depicts a process for compensating laser alignment errors in an additive manufacturing machine in accordance with embodiments.

FIG. 3 depicts process 300 for compensating laser alignment errors in an additive manufacturing machine in accordance with embodiments. Sensor data is collected, step 305. The sensor data can be obtained from sensors monitoring a powderbed surface. The sensor data can be collected after operation of a recoater distributing powder across the powderbed. The sensors collect data representing height variations across at least a portion of the scanfield.

Dimensional data can be derived, step 310, from the sensor data. The dimensional data can be variances in one or more of height, tilt, and/or pitch across the scanfield between the powderbed surface and the burn-paper calibration plane. A distribution of the variances across the scanfield is determined by analyzing the dimensional data, step 315.

Z-axis calibration offset point(s) can be calculated, step 320, from the variances for at least a portion of points across the scanfield. The z-axis calibration offset points can be provided, step 325, to a calibration table accessed by the scan unit. Process 300 can repeat, step 330, for subsequent recoating of the powderbed surface by returning to step 305. The values of the z-axis calibration offset points can be used to adjust, step 335, elements of the calibration table to compensate for misalignment of the energy beam(s) across the scanfield. This adjustment can be made for elements of the calibration table that are in physical position correspondence with the offset points at locations on the powderbed surface.

In accordance with embodiments, the dimensional data representing variances in height, tilt, and/or pitch across the scanfield can be analyzed to determine problems and degradation in the recoater shape and/or gas flow. In some implementations, the analysis can compare historical records of dimensional data from previous layers and/or builds.

Embodying systems and methods improve build quality and material properties in additive manufacturing machines. Where the additive manufacturing machine includes two or more energy beams, embodying compensation techniques reduce misalignment errors among the beams to reduce beam misalignment seams and improve accuracy of production. These compensation techniques address errors that can change during machine use, thus machine setup, calibration time, and frequency of recalibration are reduced compared to conventional techniques that require manual intervention and recalibration at greater frequency.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method of calculating laser alignment error compensation factors for an additive manufacturing machine, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A system for energy beam alignment error compensation in an additive manufacturing machine, the system comprising:
a processor unit configured to execute executable instructions that cause the processor unit to perform a method, the method including:
collecting data from one or more sensors, the data representing height variations across at least a portion of a first surface of a powderbed;
deriving dimensional data from the collected data;
analyzing the dimensional data to determine a distribution of differences between the first surface and a calibration plane used for a first spatial calibration; and
calculating z-axis calibration offset points for inclusion in a calibration table containing x-y planar offsets to correct laser alignment errors representing energy beam positional offsets between commanded locations and the first spatial calibration, the z-axis calibration offset points adjusting the x-y planar offsets.

2. The system of claim 1, the dimensional data being variances in one or more of height, tilt, or pitch across the first surface.

3. The system of claim 1, the one or more sensors selected from a group including optical detectors, image capture devices, line array energy sensors, and mechanical measurement devices.

4. The system of claim 1, including for one or more successive powderbed layers the executable instructions configured to cause the processor unit to perform the method by repeating data collecting, deriving dimensional data, analyzing the dimensional data, and calculating an updated z-axis calibration offset points.

5. The system of claim 1, including the z-axis calibration offset points compensating for parallax errors caused by the laser alignment errors.

6. The system of claim 1, including the executable instructions configured to cause the processor unit to perform the method by applying machine learning techniques to quantify the distribution of differences between the first surface and the calibration plane.

7. The system of claim 1, including the executable instructions configured to cause the processor unit to analyze the dimensional data to identify degradation in recoater shape or gas flow.

8. A method of energy beam alignment error compensation in an additive manufacturing machine, the method comprising:
collecting data from one or more sensors monitoring a first surface of a powderbed proximal to a scan unit of the additive manufacturing machine, the data representing height variations across at least a portion of the first surface of the powderbed;
deriving dimensional data from the collected data;
analyzing the dimensional data to determine a distribution of differences between the first surface and a calibration plane used for a first spatial calibration; and
calculating z-axis calibration offset points for inclusion in a calibration table, the calibration table containing about x-y planar offsets to correct laser alignment errors representing energy beam positional offsets between commanded locations and the first spatial calibration; and
the z-axis calibration offset points adjusting the x-y planar offsets.

9. The method of claim 8, including for one or more successive powderbed layers repeating data collecting, deriving dimensional data, analyzing the dimensional data, and calculating an updated z-axis calibration offset points.

10. The method of claim 8, including the z-axis calibration offset points compensating for parallax errors caused by the laser alignment errors.

11. The method of claim 8, including applying machine learning techniques to quantify the distribution of differences between the first surface and the calibration plane.

12. The method of claim 8, including analyzing the dimensional data to identify degradation in recoater shape or gas flow.

13. The method of claim 8, the dimensional data being variances in one or more of height, tilt, or pitch across the first surface.

14. A non-transitory computer-readable medium having stored thereon executable instructions when executed by a processor unit cause the processor unit to perform a method of energy beam alignment error compensation in an additive manufacturing machine, the method comprising:
collecting data from one or more sensors monitoring a first surface of a powderbed proximal to a scan unit of the additive manufacturing machine, the data representing height variations across at least a portion of the first surface of the powderbed;
deriving dimensional data from the collected data;
analyzing the dimensional data to determine a distribution of differences between the first surface and a calibration plane used for a first spatial calibration; and
calculating z-axis calibration offset points for inclusion in a calibration table, the calibration table containing about x-y planar offsets to correct laser alignment errors representing energy beam positional offsets between commanded locations and fiducial marks generated on the burn-paper; and
the z-axis calibration offset points adjusting the x-y planar offsets.

15. The non-transitory computer-readable medium of claim 14, the executable instructions further configured to cause the processor unit to perform the method, including for one or more successive powderbed layers, repeating data collecting, deriving dimensional data, analyzing the dimensional data, and calculating an updated z-axis calibration offset points.

16. The non-transitory computer-readable medium of claim 14, the executable instructions further configured to cause the processor unit to perform the method, including the z-axis calibration offset points compensating for parallax errors caused by the laser alignment errors.

17. The non-transitory computer-readable medium of claim 14, the executable instructions further configured to cause the processor unit to perform the method, including applying machine learning techniques to quantify the distribution of differences between the first surface and the calibration plane.

18. The non-transitory computer-readable medium of claim 14, the executable instructions further configured to cause the processor unit to perform the method, including analyzing the dimensional data to identify degradation in recoater shape or gas flow.

19. The non-transitory computer-readable medium of claim 14, the dimensional data being variances in one or more of height, tilt, or pitch across the first surface.

20. The non-transitory computer-readable medium of claim 14, the executable instructions further configured to cause the processor unit to perform the method, including comparing historical records of the dimensional data from at least one of a previous layer or a previous build.

\* \* \* \* \*

UNITED STATES PATENT AND TRADEMARK OFFICE
CERTIFICATE OF CORRECTION

PATENT NO. : 12,337,529 B2
APPLICATION NO. : 18/317437
DATED : June 24, 2025
INVENTOR(S) : Brian Scott McCarthy et al.

It is certified that error appears in the above-identified patent and that said Letters Patent is hereby corrected as shown below:

In the Claims

Claim 4, Column 5, Lines 34-35, change "analyzing the dimensional data, and calculating an updated z-axis calibration offset points" to --analyzing the dimensional data, and calculating updated z-axis calibration offset points--.

Claim 8, Column 5, Lines 61-62, change "the calibration table containing about x-y planar offsets to correct laser alignment" to --the calibration table containing x-y planar offsets to correct laser alignment--.

Claim 9, Column 6, Line 4, change "and calculating an updated z-axis calibration offset points" to --and calculating updated z-axis calibration offset points--.

Claim 14, Column 6, Lines 18-19, change "executable instructions when executed by a processor unit" to --executable instructions that when executed by a processor unit--.

Claim 14, Column 6, Lines 32-33, change "the calibration table containing about x-y planar offsets to correct laser alignment" to --the calibration table containing x-y planar offsets to correct laser alignment--.

Claim 15, Column 6, Lines 44-45, change "and calculating an updated z-axis calibration offset points" to --and calculating updated z-axis calibration offset points--.

Signed and Sealed this
Ninth Day of September, 2025

Coke Morgan Stewart
*Acting Director of the United States Patent and Trademark Office*